United States Patent [19]

Watson

[11] Patent Number: 4,628,734

[45] Date of Patent: Dec. 16, 1986

[54] ANGULAR RATE SENSOR APPARATUS

[75] Inventor: William S. Watson, Eau Claire, Wis.

[73] Assignee: Watson Industries, Inc., Eau Claire, Wis.

[21] Appl. No.: 614,336

[22] Filed: May 25, 1984

Related U.S. Application Data

[63] Continuation-in-part of Ser. No. 341,229, Jan. 21, 1982, abandoned.

[51] Int. Cl.[4] ............................................ G01P 15/10
[52] U.S. Cl. ...................................................... 73/505
[58] Field of Search .............. 73/505; 74/5 R; 310/25

[56] References Cited

U.S. PATENT DOCUMENTS

| 2,455,939 | 12/1948 | Meredith | 73/505 |
|---|---|---|---|
| 2,513,340 | 7/1950 | Lyman | 73/505 |
| 2,544,646 | 3/1951 | Barnaby et al. | 73/505 |
| 2,974,530 | 3/1961 | Jaouen | 73/505 |
| 4,524,619 | 6/1985 | Staudte | 73/505 |

FOREIGN PATENT DOCUMENTS 1540279  2/1979  United Kingdom .................. 73/505

OTHER PUBLICATIONS

Watson, W. S., "Piezoelectric Vibrating Beam Rate Gyro", Navy Technical Disclsoure Bulletin, vol. 4, No. 6 Jun. 1979, pp 41–45.

Primary Examiner—Jerry W. Myracle
Attorney, Agent, or Firm—Merchant, Gould, Smith, Edell, Welter & Schmidt

[57] ABSTRACT

An angular rate sensor structure displaying high immunity to noise and feedback vibration is disclosed. Mounting elements (15) support a pair of matched vibratory piezoelectric bender elements (10) in symmetrical opposed alignment about a nodal axis (20). Each vibratory element includes a drive element (10A) and sense element (10B) connected to and for operative movement with the drive element. Resonance drive element (30) moves the vibratory elements (10) in a first mode of movement, in dirct opposition to one another about the nodal axis. The sensing members (10B) detect movement of the vibratory elements in directions other than in the first mode of movement resulting from application of external angular rate forces applied to the vibratory elements.

28 Claims, 8 Drawing Figures

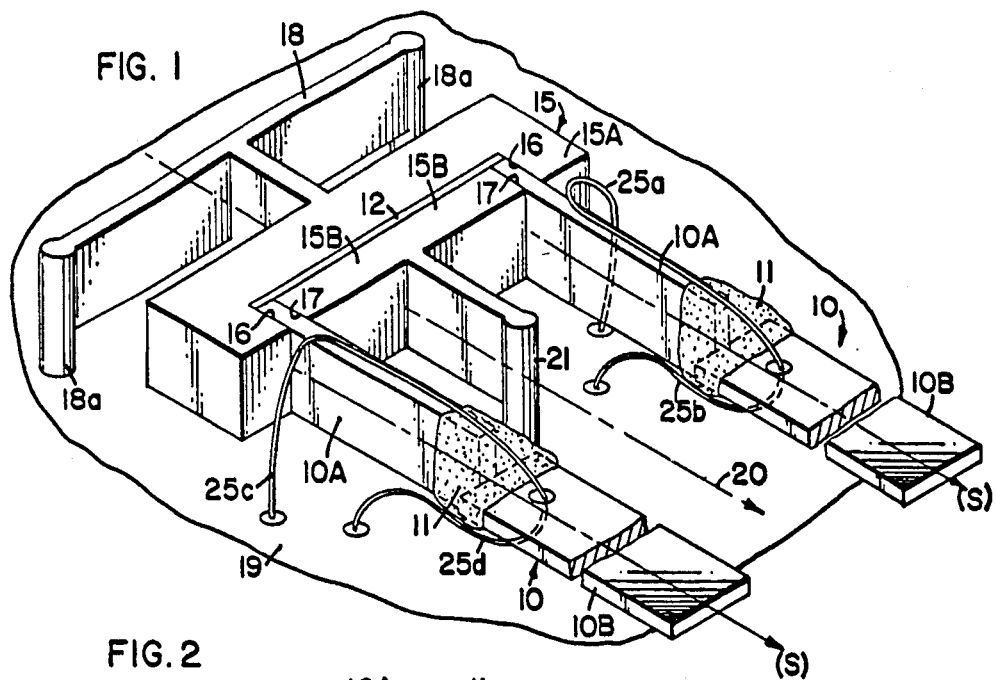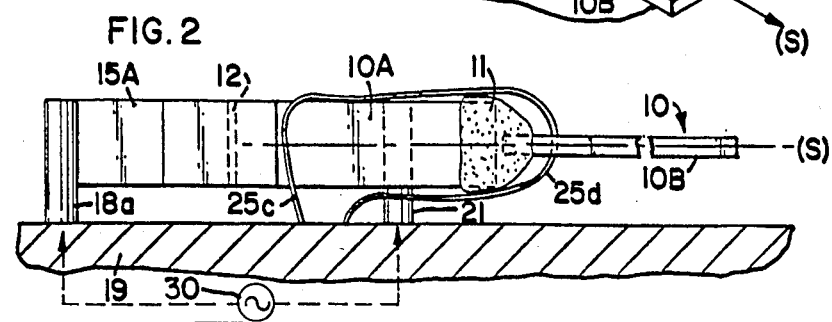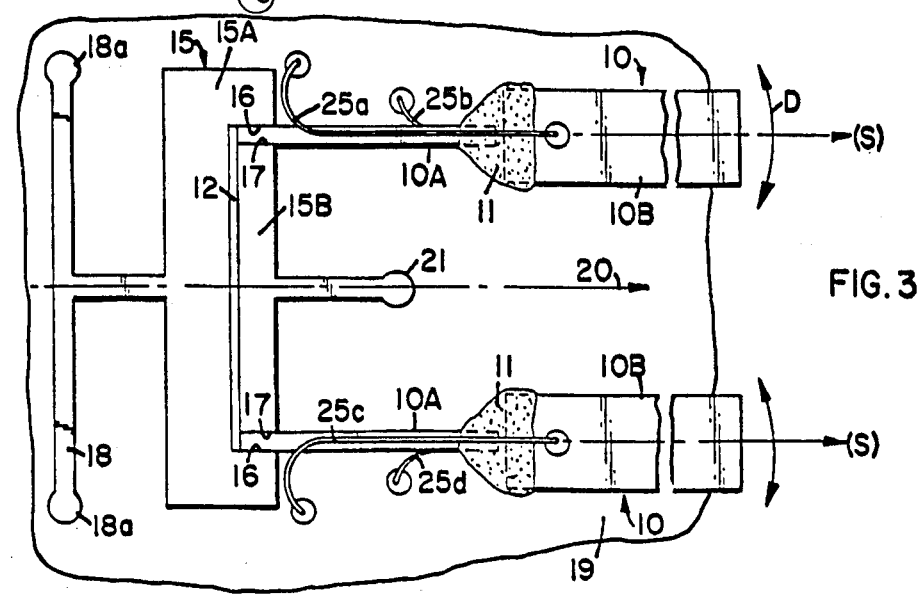

Transfer Function of a Resonant Element.

Drive Resonance = 800 HZ
Sense Resonance = 800 HZ

Demodulated System Response.

Demodulated System Response With
and Without Tuning Error.

Demodulated System Response,
Separated Resonances.

ANGULAR RATE SENSOR APPARATUS

CROSS REFERENCE

This is a continuation-in-part of application Ser. No. 341,229, filed on Jan. 21, 1982 now abandoned. This specification cross references and incorporates portions of my co-pending U.S. patent application Ser. No. 280,500 entitled RESONANCE DRIVE OSCILLATOR CIRCUIT, filed on July 6, 1981 now U.S. Pat. No. 4,479,098.

TECHNICAL FIELD

This invention relates generally to angular rate sensor structures, and in particular to a configuration for dual vibrating piezoelectric bender element sensor structures particularly applicable to highly accurate and sensitive senor instrumentation applications.

BACKGROUND OF THE INVENTION

The instrumentation sensor art has for many years used gyroscopic rate of turn instruments having a spinning gyro. The gyro when forced to turn about an axis perpendicular to its spin axis, exerts a measurable couple force that is proportional to the rate of turn being sensed. Such gyro instrumentation is generally expensive due to the precision involved in its design, construction and operation.

More recently, instrumentation sensors have been developed that require no rotating parts but operate on the principal of vibration of constrained actuator masses. Such vibrating masses may take a number of different configurations such as reed members, piezoelectric bender elements such as crystals and ceramics, or electromagnetic members.

The principle of operation of vibratory mass instrumentation sensors is fairly simple. If the mass is vibrated or maintained in oscillation in a straight line along which it is guided by a constraint, the oscillating mass will not apply any force (other than its own weight) in a direction transverse to the guide as long as the guide maintains a constant orientation in space. However, if the guide is forced to rotate about an axis at right angles to itself, the oscillating member will "feel" the forces applied to it through the guide member and will respond to such applied forces by generating a signal or a change in vibratory motion that can be detected by the sensing circuit or mechanism. For example, when a piezoelectric bender vibratory element is used, the bender element will respond to such applied force by generating alternating or pulsating signals proportional to the applied force. When an electromagnetic vibratory sensing system is used, the sensor will respond to such applied force by causing a detectable change in the characteristics of the sensed electromagnetic field. Similarly, when a capacitive sensing system is used, the vibrating element will respond to such applied force by causing a disturbance or detectable change in the sensed capacitive environment. Similar analogies can be made with respect to other forms of sensing detection, such a electro-optics and the like.

A description of the principles of vibrating mass angular rate sensor structures in general, and as specifically applied to such a system incorporating a piezoelectric bender element sensor structure, is detailed in my co-pending patent application entitled Resonance Drive Oscillator Circuit, Ser. No. 280,500 filed on July 6, 1981, and in my published article entitled "Piezoelectric Vibrating Beam Rate Gyro" published in the Navy Technical Disclosure Bulletin Vol. IV, No. 6, June 1979. To the extent that such disclosures are relevant to an understanding of this invention, they are herein incorporated by reference.

In the past, the primary emphasis in the design of vibratory angular rate sensor structures, has been in the details of construction of the vibrating mass itself, or in the circuitry used to drive the mass and/or to detect and analyze the sensed signal. A common problem associated with prior art vibrating element angular rate senor structures which also exhibit the desired sensitivity, is that they are inherently sensitive to acoustic interference, external noise or feed-back vibration and acceleration sensitivity and typically display a limited frequency response. To minimize the effect of "external" and "feed-back" vibratory noise on the operation of the vibrating sensor element, expensive packaging configurations have been required and extreme precautions in mounting the angular rate sensor housing apparatus were required to be followed. Such mounting precautions, besides adding to the cost of the unit installation, depend for their integrity upon the operator or technician performing the installation.

Thus, it would be desirable in the art to have a vibratory angular rate sensor having the operative sensitivity and accuracy required, yet one which displays a high rejection capability to externally applied and internal feed-back vibratory noise, in a manner that eliminates or minimizes special precautions in mounting of the completed unit. The present invention provides an angular rate sensor structure that satisfies the above criteria, by minimizing linear and torsional vibration transmitted through the vibratory drive and the effects of acoustic vibration transmitted or received by the vibratory elements. The present invention employs a pair of vibratory sensor elements mounted in a unique manner for opposed vibratory motion, in a manner that provides immunity from outside vibrational noise as well as from vibratory feed-back from the drive source itself.

While angular rate sensors in the past have used what might appear as opposed vibratory motion configurations (see for example U.S. Pat. Nos. 2,513,340 dated July 11, 1950 and 2,817,779 dated Dec. 24, 1957) such structures did not employ the opposed motion structure in the same manner as contemplated by this invention. In both of the structures described in these patents, the principle of rate sensing measurement depended upon oscillatory torque of the entire system assembly along the sense axis. The inertia of such device necessarily limits its responsiveness or effectiveness, unless the torquing forces are quite high. In such a case vibratory radiation in torsion becomes a limiting factor to the sensor. Similarly, while the conventional "tuning fork" configuration appears at first blush to be similar to the opposed motion sensor construction of the present invention, such conventional tuning fork arrangements (as will become more apparent hereinafter) are distinguishable from the principles of the present invention in that the tuning fork configurations are designed such that the acoustic waves formed between the vibratory elements add to and amplify one another so as to actually generate and radiate acoustic signals. As described in more detail hereinafter, the construction of this invention is designed such that the vibrational acoustic signals from the opposed vibratory elements cancel one another along a nodal axis such that acoustic signal transmission from the sensor structure is negligible. Conversely, external acoustic noise signals received by the sensor elements are nulled-out by the sensor apparatus and do not become a parameter requiring physical or electrical damping or filtering.

To avoid the above prior art problems, later developments used lightweight and active vibratory sensing elements as, for example, illustrated in U.S. Pat. No. 3,842,681 issued on Oct. 23, 1974. While the improved structure provided a torsional drive and vibratory response on the sense element that was proportional to the angular rate, by its very nature, such structure displayed a low resonant frequency which limited its sensing band-width, and the torsional vibration and acoustic problems associated with such structure were significant.

The present invention effectively addresses and overcomes most of the above-mentioned deficiencies of prior art vibratory element angular rate sensors. The principles of the present invention while primarily applicable to piezoelectric bender sensing elements, can also be implemented through electromagnetic principles using magnetic drive fields for the vibratory element and appropriate sensing means such as magnetic, electroptic or capacitive sensing configurations. The present invention provides a cost-effective angular rate sensor that is relatively insensitive to acoustic interference or to external or feed-back linear or torsional vibration, while displaying a broad frequency response, and one which requires minimal installation precautions or expense. In short, the present invention provides a simple and effective means for significantly reducing most of the error sources encountered in prior art vibrating element angular rate sensors.

SUMMARY OF THE INVENTION

The present invention provides an improved angular rate sensor structure having a high degree of accuracy and sensitivity, yet being relatively insensitive to externally applied noise and vibration signals. The sensor structure of this invention practically eliminates the emission of torsional or linear vibratory signals through its mounting base or housing that could cause undesireable and error causing feedback signals, thereby minimizing special requirements and precautions typically heretofore followed in the mounting of angular rate sensor structures.

The sensor structure employs a pair of symmetrical, closely spaced vibratory sensor elements mounted for physical vibration or movement in direct opposition to one another about a nodal axis. Appropriate drive means are provided for energizing the pair of sensor elements for operation in a first mode of movement, for direct opposing motion relative to one another about the nodal axis. When operating in such first mode of movement, the respective vibrational forces transmitted from the vibrating sensor elements as a result of their movement, to the mounting means, cancel along the nodal axis in a manner such that transmission of linear and torsional vibrational forces through the sensor mounting structure and radiation of acoustic vibration from the sensor elements, is negligible. Conversely, external noise vibration or acceleration forces transmitted through the mounting structure to the vibrating sensor elements, is translated through the pair of sensor elements in exact opposition to one another, causing the pair of sensor elements to cancel out the effect of such noise or acceleration forces. Sensing means are operatively connected with at least one of the vibratory sensor elements for producing a sensed output signal in response to a change in the movement of the sensor element from its first vibratory mode of operation.

According to a preferred embodiment of the invention, the vibratory sensor elements comprise a pair of piezoelectric ceramic bender elements symmetrically disposed and mounted in cantilevered closely spaced, generally parallel manner about the nodal axis. Each of the vibratory bender members includes a driver element and a sense element. The drive element is connected to a resonance drive oscillator for driving the drive and sense elements at a predetermined drive frequency equal to the natural resonant frequency of the drive element. The sense elements are preferably selected and configured so as natural resonant frequency that is higher than that of the drive elements. The ratio of such sense to drive resonant frequency ranges is selected so as to provide a usable bandwidth for the desired output response of the sensor. In such arrangement, the sensing means comprises an appropriate connection to, and possible interconnection of the sense element portion(s) of the vibratory elements, for detecting electrical signals generated within the sense element(s) in response to an angular rate movement to which the sensor apparatus is subjected.

While the present invention will be described with respect to preferred embodiments of the invention which illustrate opposed configurations for mounting the vibratory elements of the present invention, it will be understood that other techniques could also be used within the spirit and intent of this invention. Similarly, while particular configurations, sizes, materials, Q's, resonant frequency ranges and the like for piezoelectric bender members of the preferred embodiments will be illustrated, it will be understood that other configurations and parameters could be employed within the teachings of this invention. Further, while particular sensing means are illustrated with respect to depicting movement of one or more of the vibratory elements from its normal vibrational mode of operation are illustrated, it will be understood that other sensing means could equally well be employed within the spirit and intent of this invention. These and other modifications of the invention will become apparent to those skilled in the art, in light of the following description of preferred embodiments of this invention.

BRIEF DESCRIPTION OF THE DRAWING

Referring to the drawing, wherein like numerals represent like parts throughout the several views:

FIG. 1 is a perspective view illustrating a first embodiment of an angular rate sensor apparatus constructed according the principles of this invention, and illustrating application of the invention with piezoelectric bender element vibrating members;

FIG. 2 is a side elevational view of the angular rate sensor apparatus illustrated in FIG. 1;

FIG. 3 is a top plan view of the angluar rate sensor apparatus illustrated in FIG. 1;

DESCRIPTION OF THE PREFERRED EMBODIMENT

Figure 4:
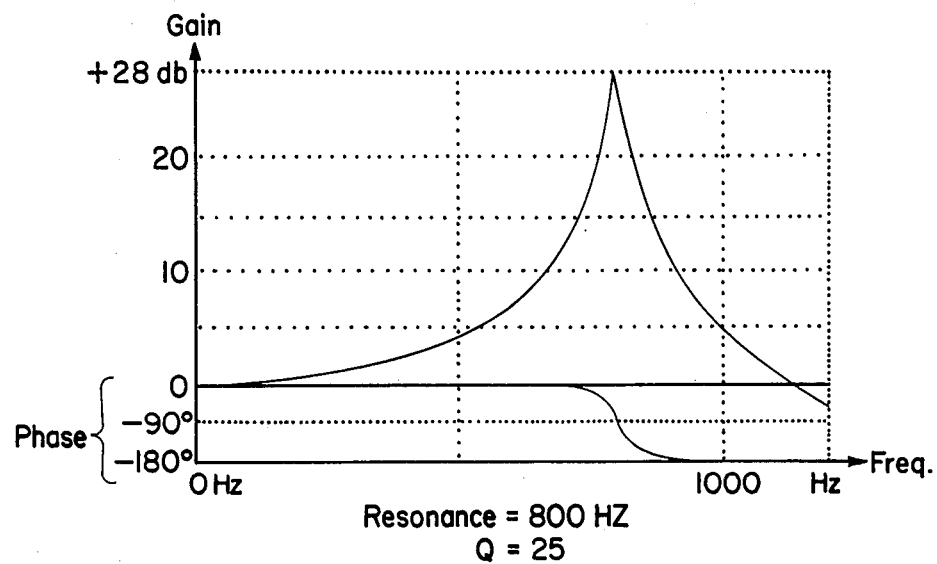
FIG. 4 is a graphic illustration of the transfer function and phase response of a typical resonant element.

This invention employs a new configuration of vibratory elements sized, arranged and configured in a manner so as to provide an improved vibrating element angular rate sensor. The sensor structure employs two identical, opposed vibrating elements mounted and driven so as to vibrate in direct opposition to one another, similar in outward appearance to the opposed mounting arrangement employed in a tuning-fork structure. The vibrating elements may, for example, comprise piezoelectric bender members such as piezoelectric ceramic or crystal members as discussed in more detail hereinafter. The vibrating elements are preferably secured at one end by a mounting mechanism and project outwardly therefrom in generally parallel, cantilevered manner toward a "free" end. The vibratory elements are matched and are generally lightweight and susceptible to controlled active motion at their respective free ends in response to an applied oscillatory drive signal. The vibratory elements are driven (vibrated) in an oscillation plane in opposition to each other about a mounting or nodal axis of symmetry. The matched vibrating elements are sized and closely spaced (hereinafter described in more detail) and arranged to be driven for motion in direct opposition to one another, such that their combined vibrational forces reflected back to the mounting base form an acoustic node at the mounting base axis of symmetry, resulting in essentially no externally transmitted vibrational acoustic energy as a result of the motion of the vibrating elements. Conversely, any external vibration noise that would otherwise be transmitted through the mounting base to the vibrating elements (e.g. in prior art structures having only a single vibrating element) or which is acoustically received by the vibrating elements is equally applied to both of the opposed vibrating elements. Since the vibrating elements are moving in direct opposition to one another, the effect of any such received vibrational noise is nulled out and does not affect operation of the sense element portions of the vibrating elements.

A preferred embodiment of the invention is diagrammatically illustrated in FIGS. 1 through 3. The preferred embodiment illustrates application of the invention to a sensor structure using piezoelectric vibratory elements. Referring to FIGS. 1 through 3, a pair of piezoelectric vibrating elements, generally designated at 10, are constructed for operation in the manner generally described in my referenced article "Piezoelectric Vibrating Beam Rate Gyro", and in my co-pending patent application "Resonance Drive Oscillator Circuit", Ser. No. 280,500 filed July 6, 1981. To the extent that the disclosures of my referred article and co-pending patent application are applicable to defining the piezoelectric elements or their mode of operation, the disclosures of the referred materials are herein incorporated by reference. It will be understood that the illustrations of FIGS. 1–3 are not to scale but are diagrammatically illustrated for enhancing depiction of detail of the vibratory elements. In particular, the vibrating elements 10 are much longer and are much more closely spaced to one another than illustrated in the Figures. In the preferred embodiment, each of the vibrating elements 10 comprises a pair of rectangular piezoelectric ceramic bender members longitudinally aligned end to end but rotated 90° from one another. It will be understood that while ceramic piezoelectric bender members are used in the preferred embodiment, that other piezoelectric bender members such as crystals could also be employed. The secured bender member (hereinafter described in more detail) is the "drive" bender member and is designated at 10A in the Figures. The second bender member is referred to as the "sense" member and is designated at 10B in the Figures. The drive member 10A and the sense member 10B are fixedly butted end to end to one another and are mounted for alignment about a "sense" axis (S), by means of an appropriate bonding agent such as epoxy, generally designated at 11.

The pair of vibrating bender members 10 are constructed to be as identical to one another as possible in physical construction mass, and in the natural resonances of their respective and analogous bender elements. One end of each of the drive bender elements 10A is fixedly mounted to a base or mounting piece generally designated at 15. The base piece 15 illustrated in the figures is symmetrically configured about a mouting or nodal axis, generally designated at 20. The mounting base illustrated comprises first and second mounting members respectively indicated at 15A and 15B. The material of the mounting base 15 should have an acoustic stiffness equal to or greater than that of the bender members 10 so as to reduce tuning errors of the bender members. As is well known in acoustic design art, material stiffness is a property relating to the propensity of the material to lose acoustic or vibrational energy (i.e. the "Q" of the material). The stiffer a material is (i.e. the higher Q that material has), the lower are its vibrational losses. In the preferred construction illustrated, the mounting piece material 15 is brass; however, any other material having the desired stiffness and vibrational damping ability could be used (as described in more detail hereinafter). The first mounting member 15A defines a generally "U"-shaped (as viewed from above) channel defining a pair of flat vertically oriented land surfces 16 (see FIG. 3), configured for uniformly engaging one side surface of the drive bender member 10A. The second mounting member 15B is "T"-shaped and sized to fit within the "U"-shaped channel of the first mounting piece 15A. The mounting member 15B has a pair of flat vertically oriented land surfaces 17 configured for uniformly engaging and sandwiching the retained ends of the drive bender members 10A between the opposed land areas 16 and 17 (see FIG. 3). An electrically insulating layer 12 is interposed between the mating surfaces of the first and second mounting members 15A and 15B and extends behind the secured ends of the drive bender members 10A, to insulate such ends from electrical contact with the mounting member 15A and to electrically isolate mounting pieces 15A and 15B from each other.

In the embodiment illustrated, the mounting pieces 15A and 15B also function as electrodes or conductors for transmitting electrical signals to and from the drive bender members 10A. In a preferred construction of the sensor apparatus the opposing flat surfaces of the drive bender members 10A are soldered in place to the flat land areas 16 and 17 of the first and second mounting members 15A and 15B respectively (FIGS. 1 and 3). The solder connections provide both electrical and mechanical connections for the drive bender members 10A to the mounting members 15A and 15B. It will be understood that the secured ends of the drive bender members 10A need not be secured by an electrode structure as illustrated, but could also be directly secured in place by appropriate bonding agents such as epoxy or glue which would form a solid mounting base with good damping characteristics. In such a configuration, the electrical connections to the drive elements thereto could be made by small wires or other electrical engagement means. Alternatively, the dimensions and tolerances of the mating portions of the first and second mounting pieces 15A and 15B could be such that the retained ends of the drive members 10A would be fixedly, frictionally held therebetween, and possibly even provide electrical contact to the drive members through such frictional engagement. Other mounting and electrical connection schemes will be readily apparent to those skilled in the art. To avoid stresses in the retained ends of the drive members 10A, it is preferrable that uniform conductive engagement be made between the land surfaces 16 and 17 of the electrode mounting pieces 15A and 15B and the engaged sides of the drive members 10A.

The first mounting piece 15A longitudinally extends outwardly along the nodal axis 20 to a "T"-shaped mounting bar, generally designated at 18, the end posts (18a) of which are secured to an appropriate base substrate 19 which could, for example, comprise a printed circuit board, housing or chassis of the sensor apparatus. The free end of the second mounting piece 15B also extends longitudinally outward along the nodal axis 20 to a mounting post, generally designated at 21, which is also secured to the substrate 19. The mounting connection of the electrode posts 21 and 18a provide electrical paths and/or contacts for the electrode base members 15A and 15B to a resonance drive oscillator circuit (diagrammatically illustrated at 30 in FIG. 2) located on or attached to or through circuit patterns forming a part of the base substrate 19. The resonance drive oscillator 30 may be of any configuration suitable for driving (i.e. vibrating) the drive members 10A at their natural resonance. However, for the sensor configuration illustrated herein a resonance drive circuit of the type described in my referenced co-pending patent application Ser. No. 280,500 is preferred.

As illustrated in the Figures, the mounting piece 15, as secured to the substrate 19 by the mounting posts 21 and 18a, suspends the vibrating bender members 10 in closely spaced cantilevered manner about their respective "sense" axes (S), symmetrically about the nodal axis 20, and above the upper surface of the substrate 19. A number of interrelated factors and considerations combine to determine the physical size and spacing considerations for the bender elements 10 within the system.

The spacing of the vibrating bender elements 10 about the nodul axis 20 (i.e. the distance between the sense axes (S)) determines the sensitivity of the sensor apparatus to acoustic noise and its propensity to radiate acoustic noise. This dimension is illustrated at "X" in FIG. 8. Using acoustic wave propagation theory related to destructive interference of wave fronts of closely spaced wave front emitters, in order to cancel 90 percent of the radiated acoustic energy from the sensor apparatus, the bender element spacing "X" should preferably be less than 0.008 wavelengths, wherein the wavelength is determined by the resonance drive frequency of the drive elements 10A. As pointed out above, the drive elements 10A are driven at their natural resonance, which is selected to be at a suitable frequency for accomodating the application in which the sensor apparatus will be used. For example, when used in angular rate sensor applications for aircraft, minimum system frequency specifications are provided for insuring that the aircraft-produced vibration forces do not interfere with operation of the angular rate sensor. Such minimum operational frequencies are generally stated for different types or classes of aircraft according to the type of engine propelling the aircraft. For piston-powered civilian aircraft, for example, the typical specified maximum vibration spectra reaches 55 Hz. For turbine-powered civilian aircraft, the typical specified maximum vibration spectra is 500 Hz. Military rocket applications may have vibration specifications as high as 2000 Hz. In a preferred embodiment of the invention as applicable to turbine-powered civilian aircraft, the drive bender elements 10A have been selected to have a drive resonance of 560 Hz. Accordingly, the bender element spacing "X", in air, is determined to be approximately 0.200 inches in order to cancel 90 percent of the radiated acoustic energy. As will become apparent upon further description of the invention, setting of the "X" dimension necessarily has an effect upon the physical width ("w" in FIG. 8) dimensions of the bender elements, which must be sized small enough so as to prevent physical interference of the ends of the sense elements 10B when in operative motion about the nodal axis 20.

In the preferred construction of the sensor apparatus illustrated, the mounting base 15 is constructed of brass, which also provides the desired electrical conductivity for the conductor/electrode function of the mounting piece; however, as described above it is understood that other materials could equally well be used within the spirit and intent of this invention. Similarly, while the mounting piece 15 has been illustrated as serving an electrode function, it will be understood that either or both of the mounting pieces 15A or 15B could be employed as electrode members, or, alternatively, that neither might serve as electrodes, but that electrical connection to the drive elements could be made by other means as, for example, through soldered wire connections.

Similarly, while a specific configuration of the mounting base 15 has been illustrated with respect to this embodiment of the invention, it will be understood that other configurations could equally well be employed within the scope of this invention. The primary consideration in the design of such mounting base is that when the vibrating sensor elements are operatively mounted thereby, they will be symmetrically mounted about the nodal axis 20 for opposing vibration relative to one another thereabout, as will be described in more detail hereinafter. An advantage of the mounting configuration illustrated in description of the preferred embodiment of invention, and particularly with respect to the "T" configuration of the mounting extension 18, is that such "three-point" mounting structure provides for expansion along the nodal axis 20 due to temperature variations, imperfections in the mounting to the substrate 19 and the like, which expansion may relieve stress reflection back to the bender members 10.

As above described, the drive members 10A are energized through the electrode base members 15A and 15B at their secured ends. Electrical signals generated by the piezoelectric sense members 10B caused by bending thereof in response to detected angular motion, are carried from the sense members by means of fine insulated wires 25 soldered to the opposed broad surfaces of the sense members. The wires 25 are mounted along the bending axes of the drive members 10A back toward the mounting piece 15, and are secured to or through circuitry (not illustrated) on or attached to or through the base substrate 19. The wires 25 may be interconnected by means of the external circuitry in any desired manner so as to analyze and use the signals generated by the sense members 10B. In the preferred construction, the wires 25 are interconnected by the external circuitry to electronically connect the sense members 10B in "parallel". In such arrangement, wires 25a and 25b are commonly connected as one terminal of the dual sensor arrangement, and wires 25b and 25c are connected to form the second terminal of the sense members 10B. As will be appreciated by those skilled in the art, the external connection could alternately be configured for connecting the sense member signals in "series", or to directly feed the respective signals from each of the sense members 10B into appropriate "mixing" circuitry.

If connected in series, the structure illustrated in FIGS. 1–3 could be externally wired such that wires 25b and 25d were connected to one another, with wires 25a and 25c providing the "output" terminals of the dual sense member structure. Alternatively, wires 25a and 25c could be connected to one another, with wires 25b and 25d providing the "output" terminals.

As will become apparent from a full reading of this specification, it is not necessary to electrically connect the sense members 10B of "both" bender members 10. While both drive members 10A should be energized to obtained the desired vibrational results of the entire sensor structure, it may be possible to obtain adequate "sensed" information from a single one of the sense bender members 10B.

As electrically connected, in the preferred embodiment, the opposing oscillatory motion of the sense members 10B, caused by an angular "rate" motion to which the sensor apparatus is subjected, will produce signals from the sense members 10B which "add" together, such that common mode motions caused by acceleration or the like will be subtracted from one another, and thus cancel.

It will be understood that appropriate drive, sensing and detection circuitry (not illustrated herein) can be operatively connected to the electrode terminals of the mounting piece 15 and to the output terminals of the sensing wires 25 to provide the desired functions, as is well-known in the art. See for example my co-pending patent application entitled Resonance Drive Oscillator Circuit, previously cited herein.

The sense wires 25 are mounted along the planes of symmetry of the mounting system. Fine wires are used, to reduce as far as possible any undesirable radiation from or collection by the wires, of vibrational energy.

As previously stated, the pair of bender members 10 are matched as closely as possible in their respective physical and electrical properties. In the preferred embodiment the matching between the respective sense and drive members on either side of the nodal axis 20 is preferably within one hertz. While the drive members 10A and sense members 10B may be selected such that they have the same natural resonance, the prefered configuration provides for different resonant frequencies respectively for the drive and sense bender members 10A and 10B. Experimentation has shown that with the physical parameters of the preferred embodiment configuration, the preferred frequency separation occurs when the sense and drive natural resonance frequencies are separated by a factor of approximately 4/3 times the desired output response bandwidth. Therefore, in the preferred embodiment configuration described above, wherein the resonant drive frequency was selected to be 560 Hz, a sense resonance frequency of 800 Hz within a system Q of approximately 25 provides a useful output bandwidth response of over 180 Hz. The desirability of providing separation between the sense and drive resonance frequencies can be illustrated more clearly with reference to FIGS. 4–7.

In general, angular rate sensors in the art that use vibrating elements, have a resonance characterized by a high peak of response at the resonant frequency of the vibrating element, as illustrated by the transfer function of FIG. 4. For angular rate sensor configurations such as described in this specification, wherein there are both "drive" and "sense" elements, there would be two such response curves as illustrated in FIG. 4, one for the drive response and one for the sense response. The transfer function illustrated in FIG. 4 is a typical transfer function for a piezoelectric bender element of the type illustrated herein, having a resonance of 800 Hz and a Q when mounted in the sensory system of 25. It will be appreciated that while the "natural" (unmounted) Q of the bender element may be much larger (e.g. as high as 500), due to the damping characteristics of the means for operatively mounting the bender element, its Q as operatively "mounted" is generally significantly lower. It should be noted, that while the remaining discussion will describe the sensor apparatus with respect to a system Q of 25, that the invention is not limited to such "low Q" systems (i.e. Q range of 10 to 100), but that the invention applies equally well to systems having significantly higher Q values, even greater than 300.

As described more fully hereinafter, the "sense" response of the system is an important quality of the sensor apparatus. The peak of the sense response occurs at the resonant frequency of the sense axes motions. The energy from drive member (i.e. along the drive axis), which is imposed on the sense axis by angular rotations, is placed on the sense response curve at the drive resonance frequency. Most prior art angular rate sensor configurations and teachings suggest that the best arrangement is to design the sense and drive elements to have the same resonant frequencies, since it would appear at first glance that the best signal gain can be achieved in this manner. However, and as described herein, this approach does not account for "practical" implementation factors that occur in the design and operation of angular rate sensor structures.

A first consideration relates to bender element tuning matching limitations. A typical "Q" for a practical piezoelectric sensor system can be 25. This figure is based on the materials used in fabrication of the preferred embodiment described herein. Using this value as a worst case and a resonant frequency (based on convenient component sizes and typical vibration noise spectra) of 800 Hz for both the drive and sense modes of operation, the turning of the bender elements must be performed to accuracies of much less than one percent in order to match the operating responses and phase of the curves (e.g. FIG. 4) adequately.

Figure 5:
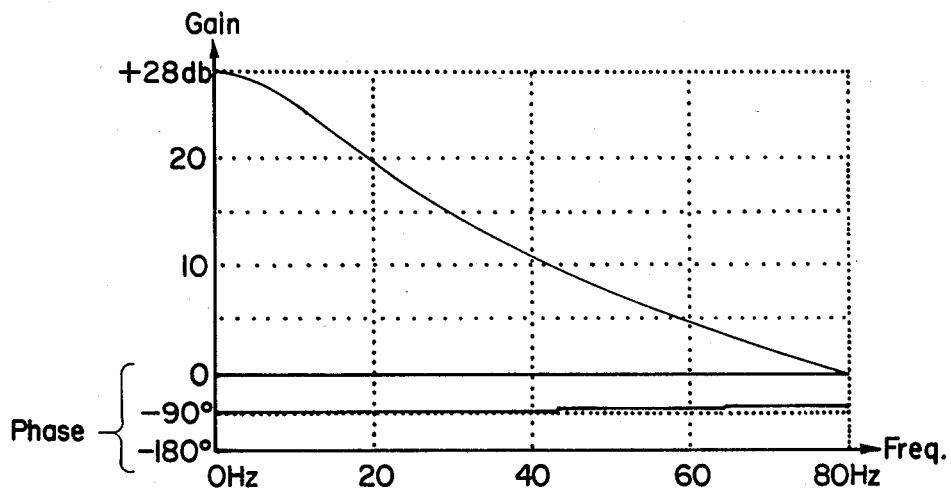
FIG. 5 is a graphic illustration of the demodulated system response for a piezoelectric sensor system having identical drive and sensor elements with the transfer functions of FIG. 4.

In terms of dynamic response, the energy transferred from the drive to the sense bender elements is divided into two equal parts and is placed on the sense response curve at the drive frequency plus and minus the input excitation frequency. This is a heterodyne response producing upper and lower sidebands. Using the previous frequencies (800 Hz) and Q (25), FIG. 5 illustrates the resulting system response as "lagging" by 90 degrees and as having a maximum obtainable bandwidth of 10 Hz at −3 db. Such response is not usable in any practical stabilization or navigation system. The fact that the D.C. response contains almost a 90 degree phase shift indicates that the output is actually more an integration of the angular rate (i.e. the output from an angular rate input will contain a strong component of angular displacement).

Figure 6:
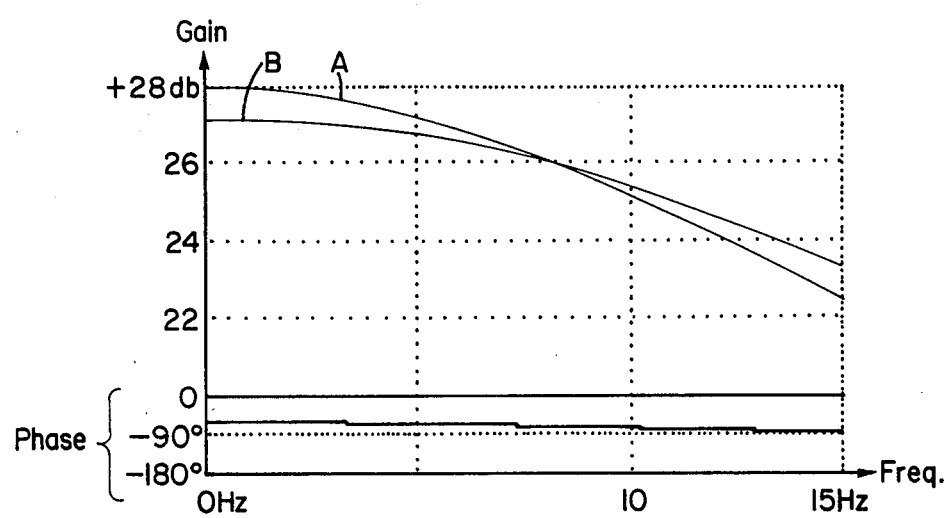
FIG. 6 is an expanded representation of FIG. 5 illustrating the distortion that results in the demodulated system response when the sense resonance changes by only one percent.

Since the match in sense and drive frequencies will have a finite error through age, over temperature, and as a result of other factors, and since there is such a strong inflection in response near resonance (for resonant systems), there will be strong variations in the response envelope and phase. This fact is illustrated in FIG. 6, wherein the sense resonance has been plotted on the expanded response curve of FIG. 5, but displaced by only one percent. The upper curve ("A") of FIG. 6 represents the expanded response curve of FIG. 5 wherein the sense resonance frequency is 800 Hz (also see Table 1), and the lower curve ("B") of FIG. 6 represents the response curve wherein the only parameter change is that the sense resonance frequency was changed by one percent, to 808 Hz (also see Table 2). The resulting distortion between the "A" and "B" curves shows nearly a 10 percent loss of gain and a phase shift of approximately 26 percent. This distortion makes the system unusable, since the actual piezoelectric elements used in such systems typically vary not only by one percent, but by as much as ±20 percent over the operable temperature range and are typically not matchable by any closer than 2 percent.

Figure 7:
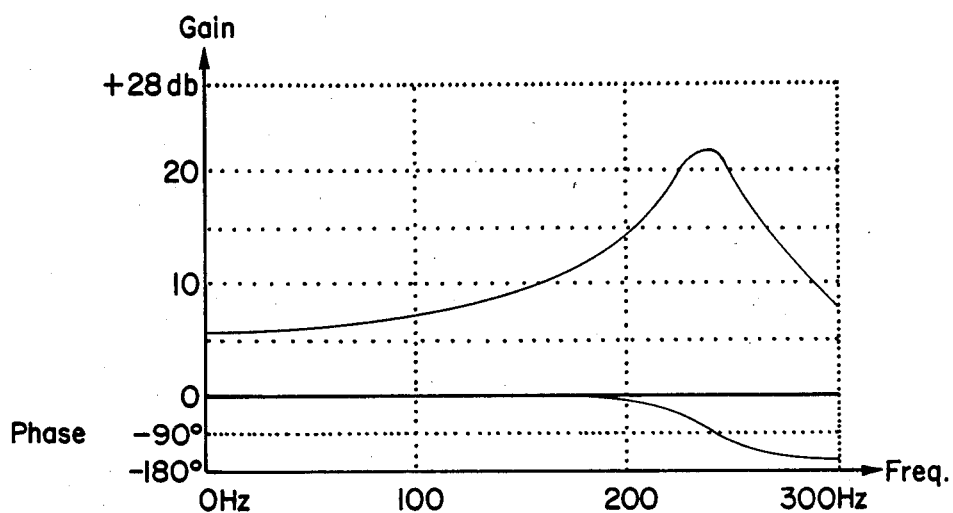
FIG. 7 is a graphic illustration of the distortion in the demodulated system response for a piezoelectric sensor system similar (but not expanded) to that of FIG. 6, wherein the resonance of the sense element is different from that of the drive element.

Accordingly, as pointed out by the above shortcomings of the prior art, in order to produce a wider usable bandwidth, there should be a difference between the sense and drive resonances. In operation, the sense member (i.e. 10B) of a vibrating angular rate sensor is more vulnerable to error from external vibrations than is the drive member. Because of this practical effect, the sense resonance should be at a higher frequency that that of the drive resonance. As stated earlier, experimentation associated with this invention has shown that the sense and drive frequencies should be separated by approximately 4/3 times the desired output response bandwidth. This result is illustrated in FIG. 7 and tabulated in Table 3. Referring to FIG. 7 and Table 3 it will be noted that for a drive resonance of 560 Hz, a sense resonance of 800 Hz, and a system Q of 25, that the output is reasonably usable to over 180 Hz (i.e. the phase is still stable and the gain is still at a low enough level wherein it can be practically controlled by standard filtering techniques. It will be noted that the tabulated data of Table 3B (i.e. for a one percent change of sense resonance), when plotted on FIG. 7 is so close to that of Table 3A that the curves appear superimposed on one another with practically no measurable response error between them. Therefore, as a result of the frequency separation of the drive and sense resonances, the sensitivity to shifts in resonances of the sense and drive elements is greatly reduced, yielding a practical form of implementing the invention.

Figure 8:
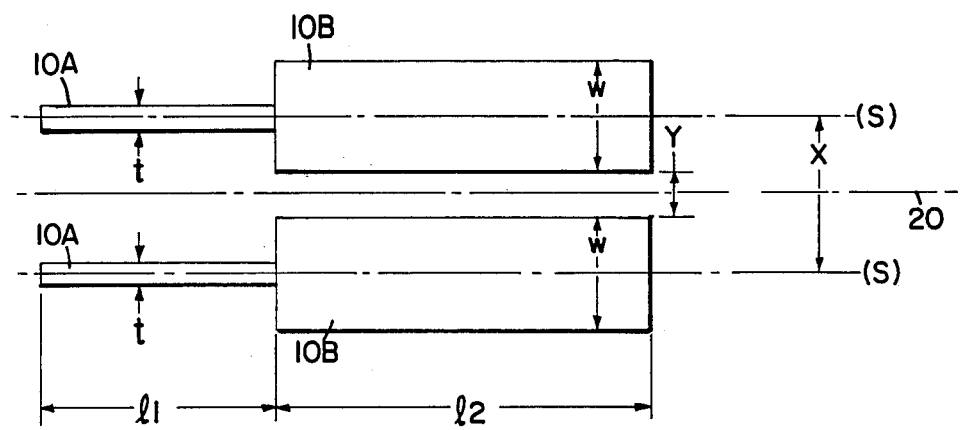
FIG. 8 is a diagrammatic view of the sensor assembly of FIGS. 1–3, illustrating various dimension parameters for the respective bender elements.

To accomplish the above sense and drive resonance relationships in the configurations described in FIGS. 1-3 (i.e. wherein the drive resonance is 560 Hz, the sense resonance is 800 Hz, and the Q is 25), the sense member 10B should be approximately twice as long as the drive member 10A, with their respective cross-sectional dimensions being identical. As discussed above with respect to selecting the inter-element spacing "X", the width dimension ("w" of FIG. 8) of the sense and drive members is limited by the physical interference of the sense member ends when in operative motion. Referring to FIG. 8, the "w" dimension must be small enough such that the "y" dimension is large enough to prevent the inner edges of the sense members 10B from interfering with one another during operative motion. The thickness dimension ("t" in FIG. 8) is generally determined by availability of standard bender element parts. In the preferred embodiment sensor configuration, the dimensions for the sense and drive members 10B and 10A respectively are as follows: sensor member length "L2" is 0.625 inches; drive member length "L1" is 0.312 inches; width "w" is 0.062 inches; and thickness "t" is 0.020 inches. It will be understood that while the above dimensions have been used for providing a system having a drive frequency of 560 Hz and a sense resonance of 800 Hz for a particular type of ceramic piezoelectric bender material, that such dimensions would appropriately be changed to accommodate other sense or drive resonant frequency system parameters or other piezoelectric materials.

TABLE 1

DATA FOR CURVE "A" IN FIG. 6

| Sense Res (Hz) | Resp. (Gain) | Gain (DB) | Phase (Deg.) |
|---|---|---|---|
| 0 | 24.999 | 27.95 | −90 |
| 1 | 24.902 | 27.92 | −90 |
| 2 | 24.615 | 27.82 | −89.98 |
| 3 | 24.151 | 27.65 | −89.95 |
| 4 | 23.529 | 27.43 | −89.91 |
| 5 | 22.776 | 27.14 | −89.85 |
| 6 | 21.918 | 26.81 | −89.79 |
| 7 | 20.984 | 26.43 | −89.72 |
| 8 | 20.001 | 26.02 | −89.64 |
| 9 | 18.992 | 25.57 | −89.55 |
| 10 | 17.979 | 25.09 | −89.47 |
| 11 | 16.978 | 24.59 | −89.37 |
| 12 | 16.002 | 24.08 | −89.28 |
| 13 | 15.061 | 23.55 | −89.18 |
| 14 | 14.162 | 23.02 | −89.08 |
| 15 | 13.308 | 22.48 | −88.97 |

KEY:
System Frequency of 800 Hz
System Q of 25
Expanded Bandwidth of 1-15 Hz
Sense Resonance of 800 Hz

TABLE 2

DATA FOR CURVE "B" IN FIG. 6

| Sense Res. (Hz) | Resp. (Gain) | Gain (DB) | Phase (Deg.) |
|---|---|---|---|
| 0 | 22.606 | 27.08 | −63.56 |
| 1 | 22.562 | 27.06 | −63.7 |
| 2 | 22.432 | 27.01 | −64.1 |
| 3 | 22.214 | 26.93 | −64.78 |
| 4 | 21.912 | 26.81 | −65.69 |
| 5 | 21.527 | 26.65 | −66.84 |
| 6 | 21.063 | 26.47 | −68.18 |
| 7 | 20.526 | 26.24 | −69.69 |

TABLE 2-continued

DATA FOR CURVE "B" IN FIG. 6

| Sense Res. (Hz) | Resp. (Gain) | Gain (DB) | Phase (Deg.) |
|---|---|---|---|
| 8 | 19.923 | 25.98 | −71.35 |
| 9 | 19.262 | 25.69 | −73.1 |
| 10 | 18.555 | 25.36 | −74.92 |
| 11 | 17.811 | 25.01 | −76.79 |
| 12 | 17.042 | 24.63 | −78.66 |
| 13 | 16.26 | 24.22 | −80.52 |
| 14 | 15.475 | 23.79 | −82.33 |
| 15 | 14.697 | 23.34 | −84.09 |

KEY:
System Frequency of 800 Hz
System Q of 25
Expanded Bandwidth of 1-15 Hz
Sense Resonance of 808 Hz

TABLE 3

DATA FOR CURVES OF FIG. 7

| Sense Res (Hz) | Resp. (Gain) | Gain (DB) | Phase (Deg.) |
|---|---|---|---|
| 0 | 1.957 | 5.83 | −3.15 |
| 10 | 1.96 | 5.84 | −3.167 |
| 20 | 1.969 | 5.88 | −3.2 |
| 30 | 1.984 | 5.95 | −3.26 |
| 40 | 2.004 | 6.04 | −3.35 |
| 50 | 2.032 | 6.16 | −3.47 |
| 60 | 2.067 | 6.3 | −3.62 |
| 70 | 2.11 | 6.48 | −3.8 |
| 80 | 2.163 | 6.7 | −4.03 |
| 90 | 2.226 | 6.95 | −4.3 |
| 100 | 2.302 | 7.241 | −4.63 |
| 0 | 1.921 | 5.67 | −3.06 |
| 10 | 1.924 | 5.68 | −3.07 |
| 20 | 1.932 | 5.72 | −3.1 |
| 30 | 1.945 | 5.78 | −3.16 |
| 40 | 1.964 | 5.86 | −3.24 |
| 50 | 1.989 | 5.97 | −3.35 |
| 60 | 2.021 | 6.11 | −3.48 |
| 70 | 2.061 | 6.28 | −3.65 |
| 80 | 2.108 | 6.48 | −3.86 |
| 90 | 2.165 | 6.71 | −4.1 |
| 100 | 2.233 | 6.98 | −4.4 |

KEY:
System Frequency of 560 Hz
System Q of 25
Expanded Bandwidth 0-100 Hz
Sense Resonance of 800 Hz The opposed arrangement for mounting the vibrating members provides a simple and fully effective means of accurately tuning the "Drive" and "sense" proportions of the vibrating members for significantly reducing most of the error sources encountered in vibrating element angular rate sensors. The energy of vibration of the vibrating elements 10 is conserved by the symmetry of the system, and virtually no vibrational energy (i.e. linear or torsional energy) is dispersed by the mounting structure to the substrate. Such structure significantly differs from known prior art angular rate sensor mounting configurations wherein energy leaving such prior art systems is typically reflected back into the system in varying amounts. Such reflective energy generally affects the sense bender member and causes erroneous and unstable readings. The structure of this invention also rejects externally generated vibrational energy by reason of its unique compensating opposing symmetrical arrangement and due to the matching of masses, stiffness and frequencies of the respectively opposed vibrating members of the system.

Sensitivity of the present invention is preserved, since it is only the lightweight sensing bender members (10B) themselves that are providing sensed readings, as opposed to those prior art sensing systems which measure oscillatory torque of the entire sensing assembly about a "general" sense axis. With the present invention, a relatively high resonant frequency can be obtained, providing increased bandwidth.

The present invention produces only a minor amount of torsional forces, yet keeps the sensitivity of the sense members 10B high. The sense members 10B are "whipped" by the drive members 10A, so that most of the vibrational energy appears at the "free" ends of the sense members. The sense members are spaced as close as possible (i.e. the "y" dimension of FIG. 8) so as to allow for a significant amount of "whip" motion with the minimum amount of operative clearance therebetween. The free ends of the sense members are driven about their respective sense axes (S) as illustrated at (D) in FIG. 3, in the oscillatory plane in which the sense axes (S) lie. The drive members 10A drive the sense members 10B in a manner such that their respective movements are in direct opposition to one another (i.e. both simultaneously move respectively toward and away from the nodal axis 20 at the same time and at exactly the same rate). The cummulative vibrational forces from such movement which is reflected back through the drive member 10A to the mounting base 15 is virtually zero, due to the "cancelling" effect of the opposing motions at the nodal axis.

The sense members respond to an "angular rate" movement (i.e. to a force perpendicular to both the angular motion and the "driven" motion) applied to the free ends of the sense members. The "forces" applied to the free ends of the two sense members 10B caused by the sensed angular motion, are in opposite directions, which forms a "couple" that results in a vibrational torsion about the nodal axis 20. Since the spacing of the "couple" is small, and since very small forces are involved due to the low mass of the bender members, the resulting torque reflected to and through the mounting base 15 is negligible. The presence of such "forces", does, however, produce a larger "bending" moment on the individual sense members 10B which is approximately ten times larger than the reflected system torque, and which causes the piezoelectric bender elements to generate electrical signals proportional to the magnitude of the bending moments of the sense member. The large bending moments on the sense members provides improved system sensitivity while reducing radiated vibration and acoustic disturbance to practically zero.

While the invention has been above described with respect to a preferred embodiment, as applicable to piezoelectric vibrational sensor members, the principles of the invention apply equally well to other types of vibrational elements as well as to other modes of detection.

From the foregoing description, it will be appreciated that the present invention solves many of the problems or deficiencies associated with prior art vibrating element angular rate sensor configurations. It will be understood that while a specific application for the present invention, as used in association with piezoelectric bender element vibration systems has been disclosed, the invention is also applicable to other actuator/mass configurations and to other forms of drive and sensing modes of operations. For example, structures for sensing the stimulation of the vibrating elements employing electroptics or capacitance sensing modes could be easily adapted to the present invention. Further, while specific configurations of mounting and drive structures have been illustrated with respect to the piezoelectric embodiment of the invention, it will be understood that other configurations employing the symmetrical opposed mounting concept for the vibrational elements could equally well be employed.

Other modifications of the invention will be apparent to those skilled in the art in view of the foregoing descriptions. This description is intended to provide specific examples of an embodiment which clearly disclose the present invention. Accordingly, the invention is not limited to the described embodiment or to use of the specific elements, dimensions, materials or configurations contained therein. All alternative modifications and variations of the present invention which fall within the spirit and broad scope of the appended claims are covered.

I claim:

1. Improved angular rate sensor apparatus, comprising:
   (a) a pair of matched vibratory piezoelectric angular rate sensor elements, each comprising a drive bender member having a drive resonance frequency and suitable for receiving an energizing drive signal and a sense bender member having a sense resonance frequency operatively connected for movement with said drive bender member and suitable for receiving an actuation stimulus;
   (b) means for mounting said pair of angular rate sensor element in close proximity within a distance of 0.008 wavelengths of said drive resonance frequency, for physical vibration in direct opposition to one another about a nodal axis;
   (c) drive means operatively connected with said drive bender members of said sensor elements for energizing said sensor elements in a first mode of operation for opposed oscillatory motion relative to one another about said nodal axis; wherein vibrational forces from said pair of elements cancel along said nodal axis such that transmission thereof through said mounting means is negligible and acoustic noise radiation from said apparatus is reduced;
   (d) sensing means independent from said drive means and operatively connected with at least one of said sense bender members for producing a sensed output signal in response to a received actuation stimulus, wherein said stimulus causes a change in movement of said one sense bender member from its first vibrational mode of operation.

2. Angular rate sensor apparatus as recited in claim 1 wherein said pair of vibratory angular rate sensor elements are physically and operatively identical to one another within acceptable operative tolerance limits.

3. Angular rate sensor apparatus as recited in claim 2, wherein said drive and said sense bender members are of the same material and have identical cross-sectional measurements.

4. Angular rate sensor apparatus as recited in claim 1 wherein said pair of sensor elements are respectively symmetrically longitudinally disposed about first and second sense axes which are coplanar and parallel to one another.

5. Angular rate sensor apparatus as recited in claim 4 wherein said sensor elements are mounted such that said sense axes are parallel to said nodal axis.

6. Angular rate sensor apparatus as recited in claim 4, wherein said drive and said sense bender members of each sensor element are connected in butted end-to-end configuration along said sense axis but oriented at 90° angles with respect to one another.

7. Angular rate sensor apparatus as recited in claim 6, wherein said drive means comprises in part said drive bender members; wherein said drive bender members when energized respectively cause said sense bender members to oscillate in an oscillation plane in directions respectively directly opposed to one another about said nodal axis.

8. Angular rate sensor apparatus as recited in claim 6, wherein said sensing means includes means for electrically connecting said sense bender members in parallel.

9. Angular rate sensor apparatus as recited in claim 8 wherein said electrical connection means includes a pair of fine wires soldered to opposing surfaces respectively of each of said sense bender members.

10. Angular rate sensor apparatus as recited in claim 6, wherein said sensing means includes means for electrically connecting said sense bender members in series.

11. Angular rate sensor apparatus as recited in claim 10 wherein said electrical connection means includes a pair of fine wires soldered to opposing surfaces respective of each of said sense bender members.

12. Angular rate sensor apparatus as recited in claim 6, wherein said mounting means comprises electrode means operatively connected to energize said pair of drive bender members; whereby when electrically energized said driver bender members cause said pair of sense bender members to move in opposing vibrational motion relative to one another.

13. Angular rate sensor apparatus as recited in claim 12, wherein said electrode means are soldered to said drive bender members.

14. Angular rate sensor apparatus as recited in claim 1, wherein said mounting means comprises electrode means operatively connected with said drive bender members for transmitting electrical current signals thereto.

15. Angular rate sensor apparatus as recited in claim 1, wherein the vibrational stiffness of said mounting means equals or exceeds that of said sensor elements.

16. Angular rate sensor apparatus comprising:
   (a) a pair of symmetrically matched vibratory piezoelectric angular rate sensor elements, each comprising:
      (i) a drive bender member having a drive resonance frequency greater than 500 Hertz and suitable for receiving an energizing drive signal;
      (ii) a sense bender member having a sense resonance frequency and suitable for receiving an external actuation stimulus, wherein said sense resonance frequency exceeds that of said drive resonance frequency;
   (b) means for mounting said pair of angular rate sensor elements in close proximity for physical vibration in direct opposition to one another about a nodal axis;
   (c) drive means operatively connected with said drive bender members of said sensor elements for energizing said sensor elements in a first mode of operation for opposed oscillatory motion relative to one another about said nodal axis; wherein vibrational forces from said pair of elements cancel along said nodal axis such that transmission thereof through said mounting means is negligible; and
   (d) sensing means independent from said drive means and operatively connected with at least one of said sense bender members for producing a sensed output signal in response to a received actuation stimulus wherein said stimulus causes a change in movement of said one sense bender member from its first vibrational mode of operation.

17. Angular rate sensor apparatus as recited in claim 16, wherein said resonance frequency of said drive member is about 560 Hertz; and wherein said resonance frequency of said sense member is about 800 Hertz.

18. Angular rate sensor apparatus comprisng:
   (a) a pair of symmetrically matched vibratory piezoelectric angular rate sensor elements, each comprising:
      (i) a drive bender member having a drive resonance frequency and suitable for receiving an energizing drive signal;
      (ii) a sense bender member having a sense resonance frequency and suitable for receiving an external actuation stimulus, wherein said sense resonance frequency exceeds that of said drive resonance frequency;
   (b) means for mounting said pair of angular rate sensor elements in close proximity for physical vibration in direct opposition to one another about a nodal axis;
   (c) drive means operatively connected with said drive bender members of said sensor elements for energizing said sensor elements in a first mode of operation for opposed oscillatory motion relative to one another about said nodal axis; wherein vibrational forces from said pair of elements cancel along said nodal axis such that transmission thereof through said mounting means is negligible; and
   (d) sensing means independent from said drive means and operatively connected with at least one of said sense bender members for producing a sensed output signal in response to a received actuation stimulus, wherein said stimulus causes a change in movement of said one sense bender member from its first vibrational mode of operation; said sensed output signal having an output response characterized by a useful bandwidth parameter; and
   (e) wherein said drive and said sense bender members are sized and configured such that the difference between the said resonance frequencies of said sense and said drive members is greater or equal to 4/3 times said bandwidth parameter.

19. Angular rate sensor apparatus as recited in claim 18, wherein said resonance frequency of said drive member is greater than 500 Hertz.

20. Angular rate sensor apparatus as recited in claim 18, wherein said pair of angular rate sensor elements are mounted in opposed parallel manner to one another along sense axes spaced within a distance of 0.008 wavelengths of said drive resonance frequency.

21. Angular rate sensor apparatus comprising:
   (a) a pair of symmetrically matched vibratory piezoelectric angular rate sensor elements, each comprising:
      (i) a drive bender member having a drive resonance frequency and suitable for receiving an energizing drive signal;
      (ii) a sense bender member having a sense resonance frequency and suitable for receiving an external actuation stimulus, wherein said sense resonance frequency exceeds that of said drive resonance frequency;
   (b) means for mounting said pair of angular rate sensor elements in close proximity for physical vibration in direct opposition to one another about a nodal axis wherein said pair of angular rate sensor elements are mounted in opposed parallel member to one another along sense axes spaced within a distance of 0.008 wavelengths of said drive resonance frequency;
   (c) drive means operatively connected with said drive bender members of said sensor elements for energizing said sensor elements in a first mode of operation for opposed oscillatory motion relative to one another about said nodal axis; wherein vibrational forces from said pair of elements cancel along said nodal axis such that transmission thereof through said mounting means is negligible; and
   (d) sensing means independent from said drive means and operatively connected with at least one of said sense bender members for producing a sensed output signal in response to a received actuation stimulus wherein said stimulus causes a change in movement of said one sense bender member from its first vibrational mode of operation.

22. An improved angular rate sensor apparatus comprising:
   (a) a support surface;
   (b) a pair of matched vibratory piezoelectric elements each extending along a sense axis and having substantially identical vibrational response characteristics, said sense axes lying coplanar and parallel to one another;
   (c) mounting means operatively connected with said vibratory elements for supporting said vibratory elements in cantilevered manner overlying said support surface in closely spaced symmetrical orientation about a common nodal axis; said vibratory elements being spaced from one another such that their sense axes lie within about 0.008 wavelengths of said drive resonance frequency; and said mounting means comprising material having a stiffness greater than that of said vibratory elements; and
   (d) drive means operatively connected with said pair of vibratory elements for causing and maintaining movement of said vibratory elements in a first vibrational mode such that said pair of vibratory elements simultaneously move in direct opposition to one another about said nodal axis; wherein torsional vibration forces transmitted from said pair of moving vibratory elements to said mounting means cancel along said nodal axis, and acoustic noise radiation from said moving vibratory elements is minimized.

23. Improved angular rate sensor apparatus as recited in claim 22, wherein said mounting means includes one or more base members for securing said mounting means to said support surface, said base members being symmetrically disposed about said nodal axis.

24. Improved angular rate sensor apparatus as recited in claim 22, wherein said mounting means comprises first and second electrodes configured to cooperatively supportively engage opposite surfaces of said drive bender members.

25. Improved angular sensor apparatus as recited in claim 24, wherein said drive means comprises in part, said first and second electrodes; and further including soldered connections between said electrodes and said drive bender membranes.

26. Improved angular sensor apparatus as recited in claim 24, wherein said first electrode includes a U-shaped receptor portion; and wherein said second electrode is configured to cooperatively mate with the U-shaped receptor member in a manner sandwiching said drive bender members between said second electrode and the opposing side wall portions of said U-shaped receptor.

27. Improved angular sensor apparatus as recited in claim 22, including sensor means for detecting motion of at least one of said vibratory elements in a direction normal to the plane in which said one vibratory element moves during said first vibrational mode of operation.

28. Improved angular sensor apparatus as recited in claim 27, wherein said sensor means comprises in part said sense bender member supported by and moving with said drive member of the associated said vibratory element.

* * * * *